United States Patent [19]
Valente

[11] 3,830,129
[45] Aug. 20, 1974

[54] MACHINE TOOL WITH SWINGABLE TOOL MOUNT

[75] Inventor: Raymond L. Valente, Kankakee, Ill.

[73] Assignee: Manco Mfg. Co., Bradley, Ill.

[22] Filed: July 9, 1973

[21] Appl. No.: 377,400

[52] U.S. Cl.......................... 83/552, 83/553, 83/700
[51] Int. Cl............................................... B26f 1/04
[58] Field of Search ............. 83/552, 553, 700, 549, 83/550, 551

[56] References Cited
UNITED STATES PATENTS

| | | | |
|---|---|---|---|
| 626,448 | 6/1899 | Tennant | 83/550 |
| 671,431 | 4/1901 | Baker | 83/550 |
| 3,685,380 | 8/1972 | Daniels | 83/552 |

*Primary Examiner*—Frank T. Yost
*Attorney, Agent, or Firm*—Olson, Trexler, Wolters, Bushnell & Fosse, Ltd.

[57] ABSTRACT

A machine tool for performing any of several machining operations on a workpiece is provided. The machine tool—here, a punching machine—has several tool members mounted on a saddle which can be swung about the free end of a ram by a saddle shifting assembly. A locking and unlocking assembly moves the saddle into and out of contact with the ram free end. Cams on the ram free end position the saddle base in a precise tool-operating location. A multiple die unit has a multi-chambered hydraulic cylinder for positioning the corresponding punch die at the work station.

15 Claims, 16 Drawing Figures

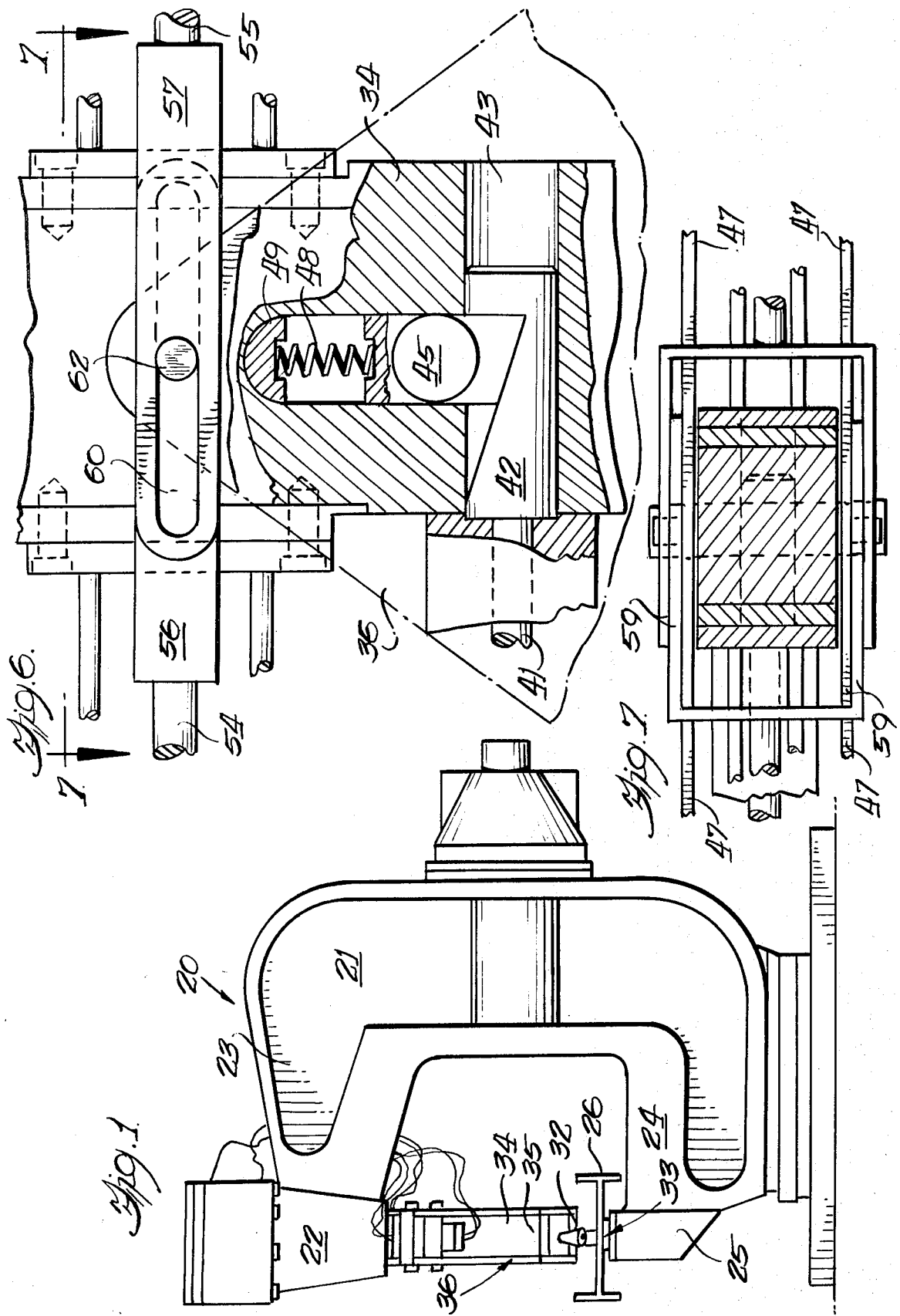

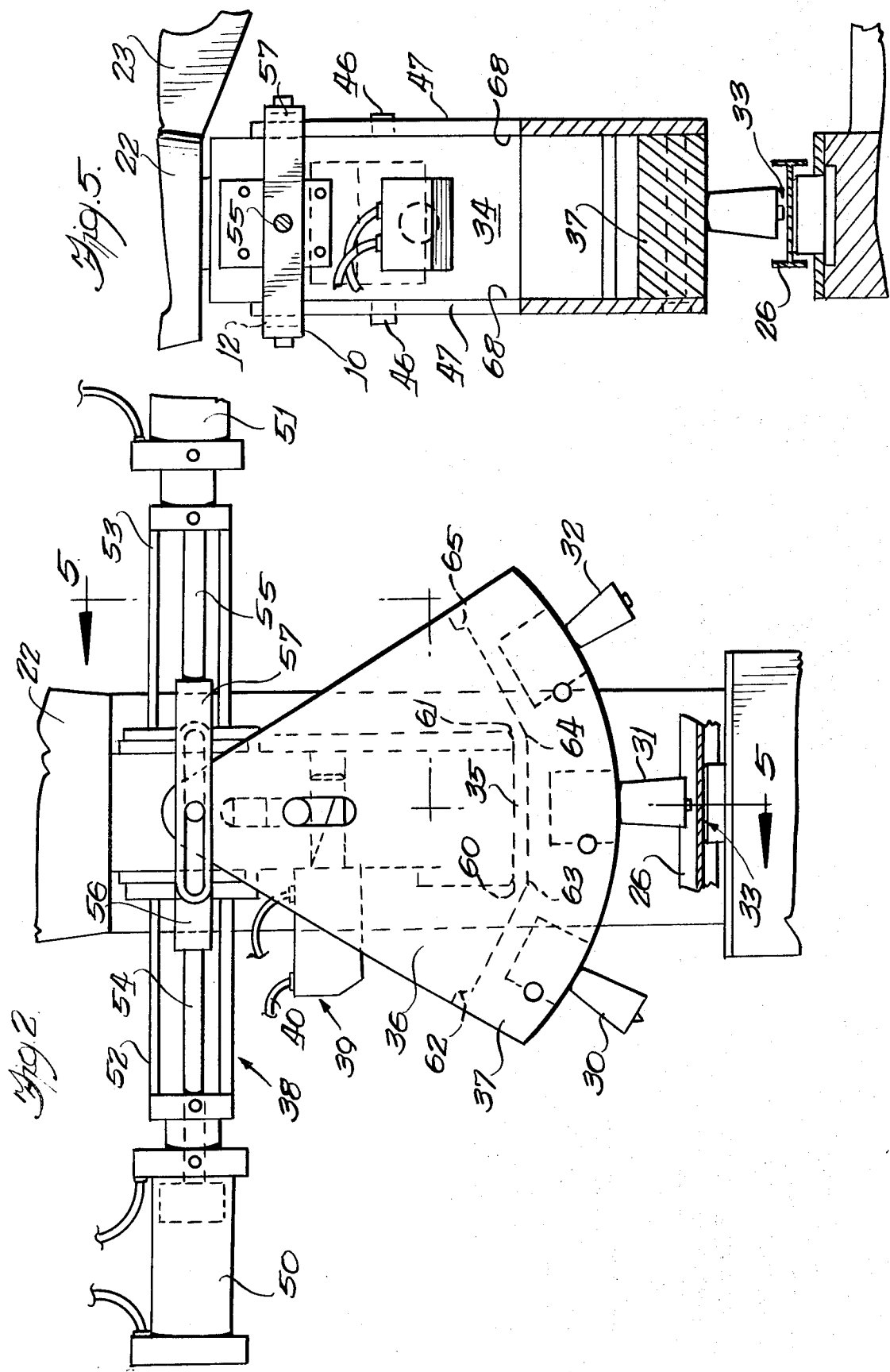

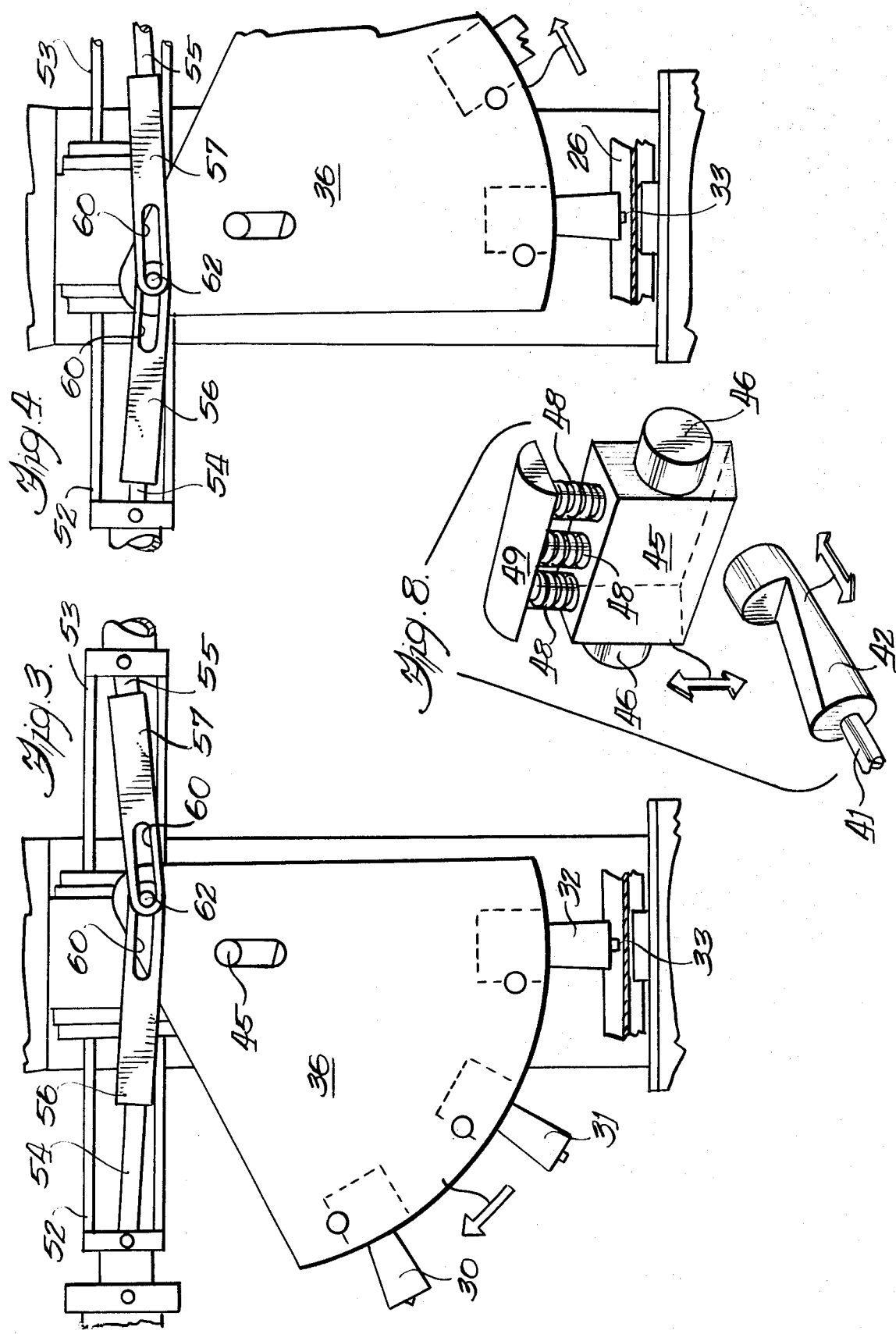

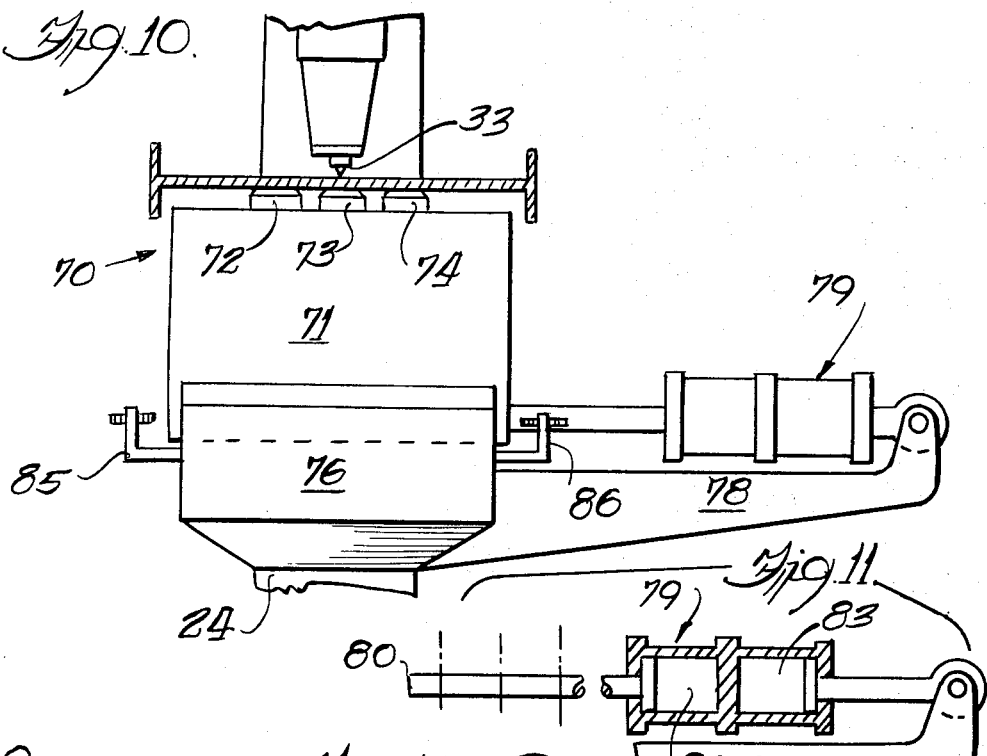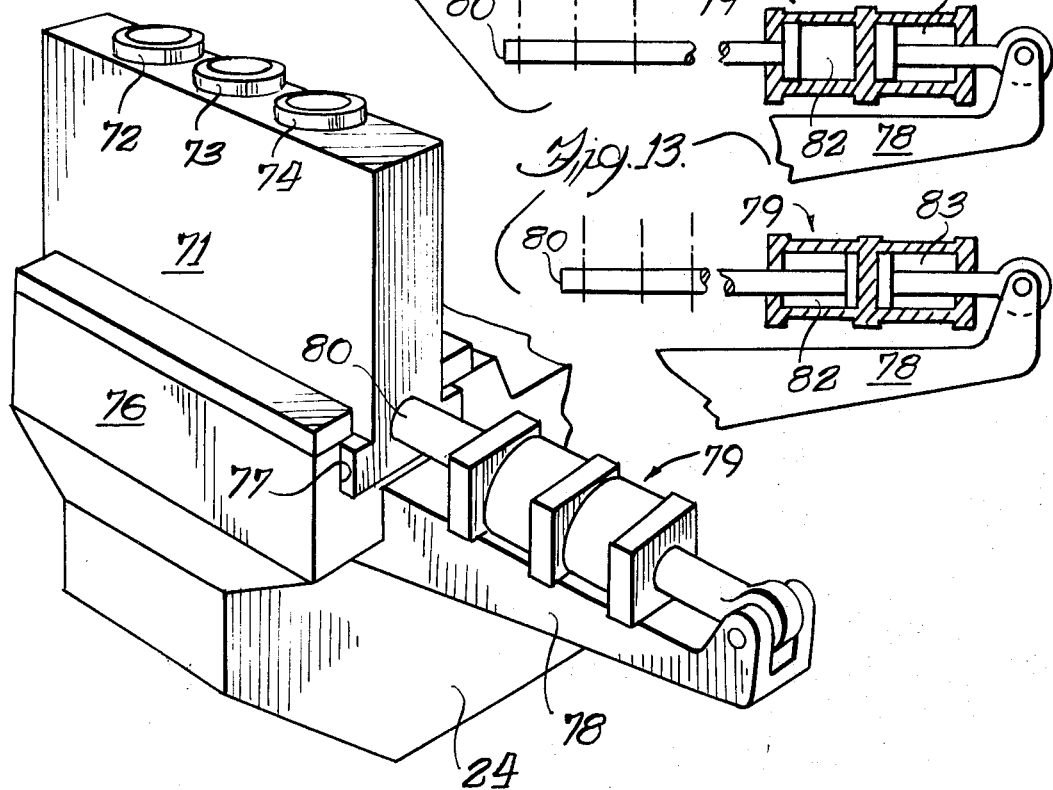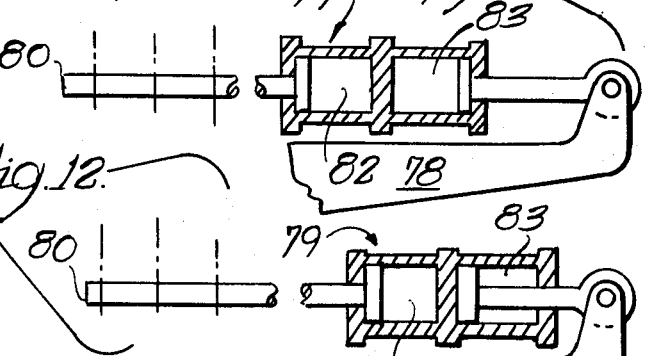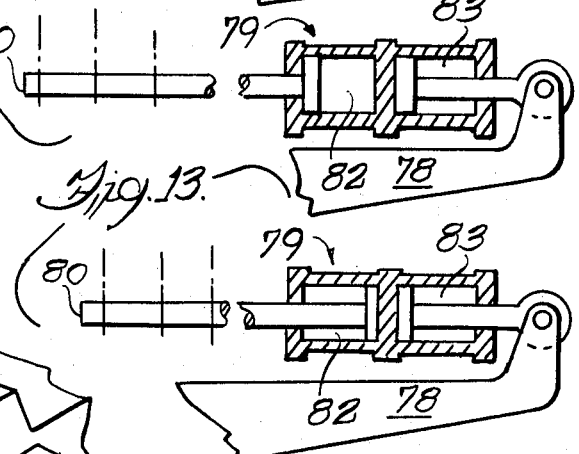

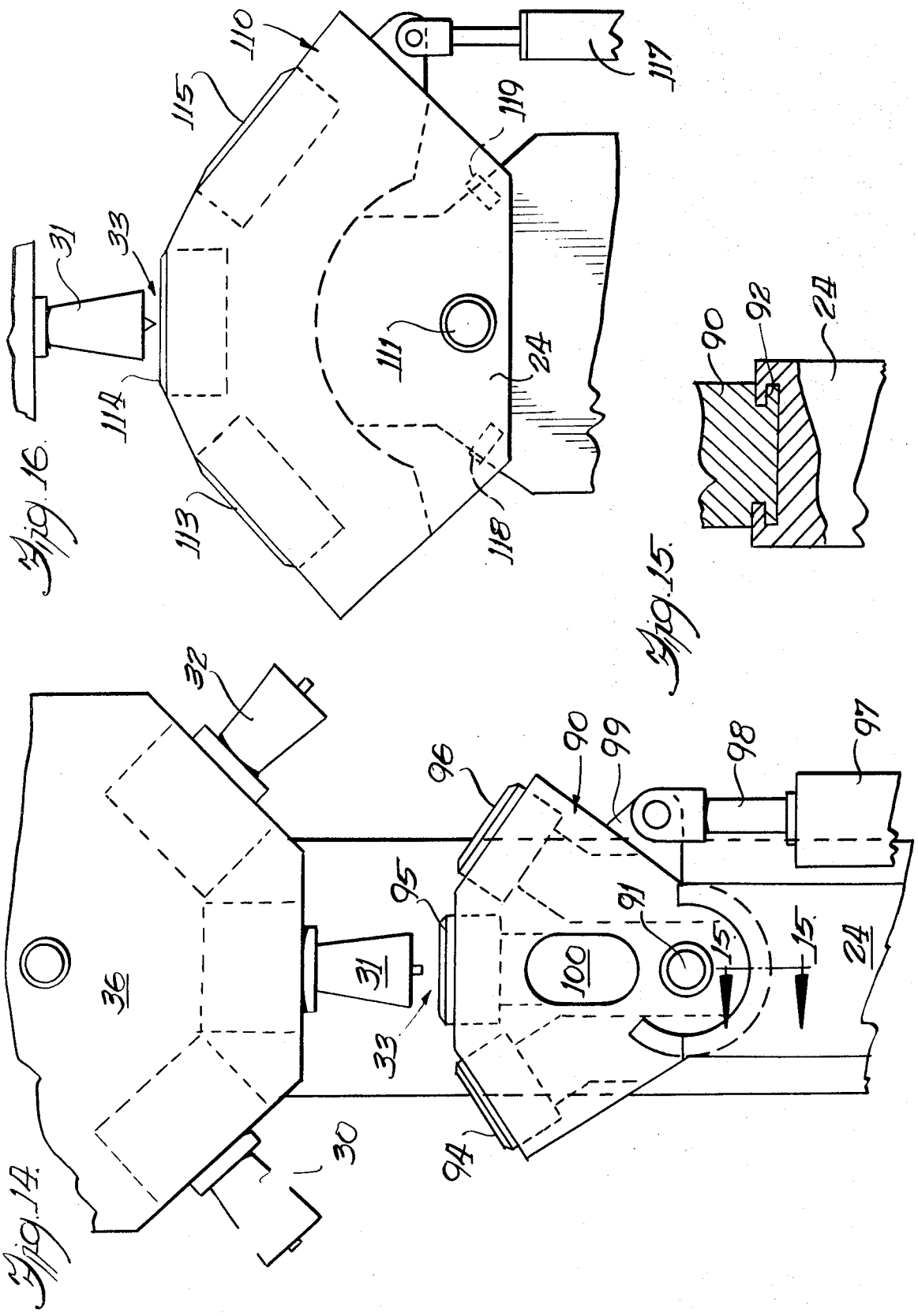

3,830,129

MACHINE TOOL WITH SWINGABLE TOOL MOUNT

BACKGROUND OF THE INVENTION

This invention relates generally to apparatus for use in the fabrication of elongated structural members or workpieces such as angle irons, I-beams, plate elements, channel irons, and the like. More particularly, the present invention provides a relatively low-cost machine tool for punching holes of a variety of sizes in such workpieces.

I-beams, channel irons and like structural steel members are widely used in the erection of buildings and other structures. Numerous apertures must be formed in these members to provide for rivets, bolts or other interconnections during construction. Frequently, it is necessary that a plurality of such apertures be formed at the end of an I-beam and at various locations along the length thereof. These apertures often constitute circular holes of various diameters and, occasionally, slots of greater or lesser elongations and various orientations. Numerous methods of forming such apertures, including drilling and punching, have been used.

Hand formation of these apertures at pre-designated locations along a structural member of extended dimension can be a time-consuming and expensive task. For this reason, machine tools such as that described in U.S. Pat. No. 3,643,535 have been designed to accommodate structural members of extended dimension and to form the described holes at predesigned locations on the members. However, when a number of apertures of varying dimensions must be formed, correspondingly different work tools such as punches of varying diameters must be located at a work station. In some holeforming devices, manual removal of a punch and substitution of a differently sized punch at a work station has continued to be a relatively expensive task.

It is therefore the general object of the present invention to provide a commercially attractive machine tool capable of quickly and efficiently forming any one of a number of differently sized holes in an elongated workpiece such as a structural steel member.

It is another object of the invention to provide a machine tool wherein the hole-forming tool can be quickly and easily changed for another tool.

It is another object of the invention to provide a relatively low cost machine tool which can precisely punch any of a variety of hole sizes and shapes in large workpieces.

Other objects and advantages of the invention will become apparent upon reading the following detailed description and upon reference to the drawings, Throughout the drawings, like reference numerals refer to like parts.

BRIEF DESCRIPTION OF THE DRAWINGS

FIG. 1 is a side elevational view showing a machine tool embodying the present invention in its overall aspect;

FIG. 2 is a fragmentary front elevational view of the machine tool showing a novel multi-punch saddle and related apparatus, a first tool such as a punch being positioned for operation upon a workpiece;

FIG. 3 is a fragmentary front elevational view similar to FIG. 2 but showing a second tool positioned for operation upon the workpiece;

FIG. 4 is a fragmentary front elevational view similar to FIGS. 2 and 3 but showing a third tool positioned for operation upon the workpiece;

FIG. 5 is a side elevational view in partial section taken substantially in the plane of line 5—5 in FIG. 2 and showing in further detail the multiple tool saddle and associated parts of the present invention;

FIG. 6 is a fragmentary front elevational view in partial section showing in yet further detail apparatus by which the mulitple tool saddle apparatus of the present invention is mounted and positioned;

FIG. 7 is a sectional view taken substantially in the plane of line 7—7 in FIG. 6 and showing in yet further detail the saddle positioning apparatus of the present invention;

FIG. 8 is an exploded view showing in further detail portions of the locking apparatus by which the multiple tool saddle device is positioned;

FIG. 9 is a perspective view showing a multiple punch die designed for use with the present invention;

FIG. 10 is a fragmentary side elevational view of the punch die shown in FIG. 9;

FIG. 11 is a fragmentary view in partial section showing punch die position and control apparatus as it appears when a first punch die is located at a work station;

FIG. 12 is a fragmentary elevational view similar to FIG. 11 in partial section showing punch die position and control apparatus as it appears when a second punch die is positioned at the work station;

FIG. 13 is a fragmentary elevational view similar to FIGS. 11 and 12 in partial section showing punch die position and control apparatus as it appears when a third punch die is located at the work station;

FIG. 14 is a fragmentary elevational view showing an alternate embodiment of the multiple punch die;

FIG. 15 is a sectional view taken substantially in the plane of line 15—15 in FIG. 14 and showing in further detail apparatus by which the alternate punch die is positioned and controlled; and FIG. 16 is a fragmentary view in elevation showing in detail yet another alternate embodiment of the punch die.

DETAILED DESCRIPTION

While the invention will be described in connection with a preferred embodiment, it will be understood that it is not intended to limit the invention to that embodiment. On the contrary, it is intended to cover all alternatives, modifications and equivalents as may be included within the spirit and scope of the invention.

Turning more specifically to the drawings, FIG. 1 shows a machine tool, here a punching machine 20, with which the present invention is associated. It will be understood that the present invention could be used with a variety of other machine tools such as drilling machines and the like; however, for clarity, the present illustrative description will be restricted to an exemplary punching machine. The punching machine 20 includes a C-shaped frame member 21 which carries punch operation and control apparatus 22 on an upper arm 23. On a lower arm 24, a punch die device 25 is formed to accommodate over it a workpiece such an an I-beam or other workpiece 26.

In accordance with one aspect of the invention, apparatus is provided to locate any one of a plurality of tools—here, punches 30, 31, or 32 of varying diameters or shapes—at a work station 33. In general, this is accomplished by providing a depending ram member 34 with a vertically movable free end 35 and a pivotally depending saddle assembly 36. At the lower end of the pivotable saddle 36 is a generally arcuate base member 37 upon which the several punches 30–32, inclusive, are mounted by any convenient means. A saddle shifting assembly 38 is arranged to bring any one of the punches 30–32, inclusive, to the work station 33 as illustrated in FIGS. 2–4, inclusive, and a saddle locating and locking assembly 39 is provided to precisely locate the saddle 36 on the ram 35 in the desired operating position.

More specifically, let it be assumed that the machine operator wishes to locate a punch 32 at the work station 33. To accomplish this, the saddle locating and locking assembly 39 is first unlocked by appropriate circuitry (not shown). As illustrated in FIGS. 2, 6 and 8, this locating and locking assembly 39 includes a hydraulic cylinder power device 40. Attached to a cylinder piston rod 41 is a locking slide member 42 which slides within a bore 43 formed in the punching ram 35. Retraction of the piston rod 41 and consequent movement of the slide member 42 (to the left, as shown in FIGS. 2 and 6) into the illustrated position permits an interconnector member 45 to be lowered into the illustrated position. As shown in FIG. 5, this interconnector member 45 is provided with opposed stubshafts 46 which engage the plates 47 of the punch-mounting saddle 36. Biasing means such as springs 48 urge a bearing shoe 49 into contact with the ram 34. Thus, appropriate actuation of the power cylinder 40 permits the saddle 36 to undergo a first motion as it is lowered away from the ram free end 35. When thus disposed, the saddle 36 is free to undergo a second movement as it swings into a new position, permitting the first punch 31 to be moved away from the work station 33 and another punch 32 to be moved into position.

When freed for tool-changing motion, the saddle 36 is moved from the position shown in FIG. 2 to that shown in FIG. 3 in the direction of the arrow by the saddle shifting assembly 38. This assembly 38 includes two oppositely mounted hydraulic cylinders 50 and 51 which are mounted upon the ram 34 by extended platforms 52 and 53, respectively. As illustrated in FIGS. 2–7, each cylinder 50 and 51 is equipped with a piston rod 54 or 55, respectively, which terminates at its free end in a fork member 56 or 57. These forks 56 and 57 are substantially identical and each is provided with a pair of tines 59 having slots 60 formed therein to accommodate pivot pins 62 which extend from the side plates 47 of the saddle 36.

It is a feature of the invention that precisely positioning the piston of each cylinder 50 and 51 at a predetermined location is not required. Rather, any of the tool punches 30–32 can be located at the work station by the fullstroke action of an appropriate selection of cylinders 50 and/or 51. To this end, each fork member slot 60 has an effective length equal to one half the stroke of the associated cylinder. Moreover, positions of the cylinders 50 and 51 and the length of the piston rods 54 and 55 are chosen so as to locate the saddle pivot pins 62 at the piston ends of the slots 60 when the saddle 36 is located in its center position and the pistons are located at the rod ends of the cylinders 50 and 51 as illustrated in FIG. 2.

Thus, when it is desired to move the saddle from the position shown in FIG. 2 to that shown in FIG. 3, the piston rod 55 is retracted into the associated cylinder 51 by appropriate application of hydraulic fluid, thereby drawing the associated slots 60 of the fork 57 over the pivot pins 62 until the free ends of the slots are reached, and thereafter drawing the pivot pins 62, as well as the opposite piston rod 54 and associated fork 56, into the new position illustrated in FIG. 3. As this motion occurs, the saddle 36 is pivoted about the stub-shafts 45 from the position shown in FIG. 2 to that shown in FIG. 3.

Conversely, when the machine operator wishes to move the saddle 36 from either the center position shown in FIG. 2 or the right position shown in FIG. 3 to the left position shown in FIG. 4, actuation of both cylinders 50 and 51 to extend the rods 54 and 55 will reverse the above-described motion and return the saddle to the position shown in FIG. 2. Actuation of the cylinders to cause retraction of the rod 54 into the cylinder 50 and extension of the rod 55 from the cylinder 51 will cause the saddle to be positioned as shown in FIG. 4.

Once the saddle 36 has reached the desired new location and the associated tool punch has been positioned at the work station 33, the locking assembly 39 is actuated to precisely locate the saddle and to lock the tool in place. To accomplish this locking in accordance with the invention, the locking assembly piston rod 41 is extended, forcing the slide member 42 to the right as shown in FIG. 6, and slightly elevating the saddle member 36 to bring the saddle base member 37 into snug engagement with the free end 35 of the ram 34. It will be noted that the ram end 35 is provided with a series of beveled cam surfaces 60 and 61. These cam surfaces 60 and 61 are formed to engage corresponding cam follower surfaces 62, 63, 64 and 65, formed on the saddle base 37. Interengagement of the adjacent cam surfaces precisely and snugly positions the saddle 36 in any of its various work positions on the ram 34 in a longitudinal plane. As will be appreciated from FIG. 5, the saddle plates 57 are positioned snugly against the sides 68 of the ram 34 to precisely locate the punches 30–32 in a transverse plane perpendicular to the plates 47 and the plane in which the saddle swings.

Use of the punch tools 30–32 may require the use of corresponding punch dies to form the desired hole in a precise and well-defined manner. To this end, the multiple die 70 shown in FIGS. 9–13 is provided. As illustrated, this multiple die 70 includes a mount 71 carrying three punch dies 72–74, inclusive. The mount 71 is adopted for linear translational movement on a base 76 having an under cut T-slot 77; this base 76 may be a terminal portion of the lower arm 24 of the machine tool.

To appropriately position any selected die 72–74 at the work station 33, an extending piston rod 78 pivotally carries a double-chambered hydraulic cylinder 79. At its other end, the cylinder is connected, by a second piston rod 80, to the slidable die mount 71. As illustrated in FIGS. 11–13, inclusive, this cylinder 79 includes two separated chambers 82 and 83 which can be independently pressurized or exhausted of fluid by means of appropriate hydraulic circuitry (not shown). When each chamber 82 and 83 is filled with fluid, the associated rod 80 is positioned in a fully extended location as illustrated in FIG. 11 and a given die punch 74 is appropriately located at the work station 33. When one chamber 82 is pressurized and the other chamber 83 is exhausted, the associated rod 80 is positioned at an intermediate location as illustrated in FIG. 12, and an intermediate die 73 is located at the work station 33. When both chambers 82 and 83 are exhausted as illustrated in FIG. 13, the third die punch 72 is located at the work station 33. If desired, set screws 85 and 86 may be included to permit precise final adjustment of die location at the work station.

An alternate form of a multipositional punch die is illustrated in FIGS. 14 and 15. In this embodiment, a multiple punch die 90 is pivoted, by a pin 91 or other convenient means, upon the lower arm 24 of the machine tool. Three punch dies 94, 95 and 96 are disposed arcuately upon the die mount 90 for rotational motion into and out of the work station 33. To provide a bearing of extended area for supporting the dies 94–96 during punching, and to provide smooth operation, an arcuate T-slot 92 is formed in the lower arm 24.

To move the dies 94–96 into and out of location at the work station 33, power adjustment means such as a hydraulic cylinder 97 can be connected by a piston rod 98 to an appropriate ear 99 on the die mount 90. This cylinder 97 can be of a construction similar to the cylinder 79 described in connection with the first-described punch die embodiment illustrated in FIGS. 9–13, inclusive. A discharge opening 100 can be provided in the die mount 90 to permit ejection of punching scrap which has been forced through the dies 94–96 during punching operations.

Yet another embodiment of a multiple punch die adapted for use with the present invention is illustrated in FIG. 16. A die body 110 is mounted for pivotal motion, as by a pin 111, upon the lower arm 24 of the machine tool. Three dies 113, 114 and 115 are mounted upon the die body 110 for appropriate location at the work station 33 upon appropriate actuation of a power means such as a cylinder 117. This cylinder 117 can be constructed in a manner similar to that of the cylinder 79 described for use with the first punch die embodiment. Appropriate stop screws 118 and 119 can be mounted upon the lower machine tool arm 24 to position the dyes 113–115 precisely at the work station 33.

The following is claimed as invention:

1. A machine tool for performing any one of a variety of operations on a workpiece located at a work station, the machine tool comprising ram means having a free end movable toward and away from the workpiece, saddle means movably mounted on the ram for first motion between a locked position on the ram free end and an unlocked position away from the ram free end and second motion swinging about the ram free end, the saddle means carrying a plurality of tool members for performing any one of a corresponding plurality of machine tool operations on the workpiece, saddle locking means to cause the first motion in the saddle, moving the saddle between its locked and unlocked position, and saddle shifting means to cause the second motion in the saddle, swinging the saddle about the ram and locating a selected tool at the work station.

2. A machine tool according to claim 1 wherein said ram is provided with first and second guide surfaces, and wherein said saddle means includes first and second plates respectively abutting said ram guide surfaces to locate the selected tool precisely in a transverse plane.

3. A machine tool according to claim 1 wherein said ram free end is provided with at lease one cam surface, and said saddle means includes a base member having a cam follower surface formed to mate with said ram cam surface and locate the selected tool precisely in a longitudinal plane.

4. A machine tool according to claim 3 wherein said saddle base member is provided with a plurality of cam follower surface sets, the number of cam follower surface sets corresponding to the number of tool members carried by the saddle means, a predetermined cam follower surface set being engaged by the ram cam surface when a correspondingly predetermined tool member is selected and located at the work station.

5. A machine tool according to claim 1 wherein said saddle locking means includes locking slide means, power means for moving the locking slide means between a saddle-locked position and a saddle-free position, and interconnector means for causing corresponding motion in the saddle ram means as the locking slide means moves toward its saddle-locked position or its saddle-free position.

6. A machine tool according to claim 5 wherein said interconnector means comprises an interconnector member having a cam surface formed to follow a cam surface on said locking slide means, and at least one stubshaft member to support said saddle means for pivotal motion thereabout when said locking slide is in its saddle-free position.

7. A machine tool according to claim 1, wherein said saddle shifting means includes first and second hydraulic cylinder members, each hydraulic cylinder member including a piston rod and a slotted fork member attached to the free end of said piston rod; the saddle shifting means further including pivot means mounted upon said saddle means and interconnecting said saddle means with the fork slots, actuation of one of said cylinders causing the pivot means to be pulled by the corresponding fork member to a predesignated position, thereby swinging the saddle means and locating a selected tool member at the work station.

8. A machine tool according to claim 7 wherein each hydraulic cylinder piston rod is capable of moving through a stroke of predetermined length, and said slots formed in said fork members are of an effective length substantially equal to one-half the piston rod stroke.

9. A machine tool according to claim 1 wherein said tool members are punches, and wherein said machine tool includes a plurality of linearly arrayed punch dies, each die adapted for punch machining cooperation with a mating punch.

10. A machine tool according to claim 9, including a movable multiple die member for mounting the punch dies, and multi-chambered hydraulic cylinder means for moving the multiple die member to a preselected position to locate a selected die at the work station.

11. A machine tool according to claim 10 wherein said multi-chambered hydraulic cylinder means includes a cylinder member having two separate chambers, and having a piston within and a connected piston rod slidably protruding from each chamber, and hydraulic circuitry connecting each chamber with a remote pressure source to permit each chamber to be pressurized and exhausted and each associated piston rod to be correspondingly extended or retracted.

12. A machine tool according to claim 11 wherein said multi-chambered hydraulic cylinder is sized and is mounted to said multiple die member so that a first die is located at said work station when both cylinder chambers are exhausted, a second die is located at said work station when only one chamber is pressurized, and a third die is located at said work station when both chambers are pressurized.

13. A machine tool for performing any one of a variety of machining operations on a workpiece, including ram means having first and second guide surfaces and a free end movable toward and away from the workpiece, the ram free end including a cam surface and saddle means comprising first and second plates respectively abutting said ram guide surfaces to locate the saddle means on the ram means in a transverse plane and a base member mounting a plurality of tool members and having a cam follower surface engageable with the ram cam surface at any of a plurality of positions to secure a selected tool on the ram in a longitudinal plane.

14. A machine tool according to claim 13 including saddle locking means interconnecting the saddle means and the locking means for moving the saddle means between a locked position wherein said ram cam and base cam follower surfaces are engaged and an unlocked position wherein said base member is free to swing about the free end of the ram to bring an alternate work tool member to the work station.

15. A machine tool according to claim 13 including saddle shifting means for shifting the saddle about the ram in a longitudinal plane and locating a selected tool at the work station.

* * * * *